Patented June 16, 1936

2,044,261

UNITED STATES PATENT OFFICE 2,044,261

ELECTROLYTIC PURIFICATION OF WATER

George T. Southgate, Forest Hills, N. Y.

No Drawing. Application August 20, 1935,
Serial No. 36,988

6 Claims. (Cl. 204—25)

This invention pertains to the electrolytic purification of water, and to certain improvements that decrease the total cost of operation. While applicable on any scale, the preferred working hereof is especially advantageous in larger utilizations such as the betterment of water for urban supply and industrial use. More specifically, the improvements relate to continuous cooperation with known steps of the method generally known as electroosmotic purification, of a cyclic auxiliary treatment that decreases the burden of the electrolysis.

As the principal application of electroosmotic purification, the removal of mineral salts from river or well water is usually practiced by continuously passing the liquid through the middle compartments of a succession of cells, each of which has three or more chambers separated by diaphragms of canvas or other porous material, with the electrodes in the outer ones. As shown by a number of patents, an important needed improvement has been recognized as that of efficiently removing the compounds formed by the discharged anions and cations in their respective compartments, by rinsing in some fashion aimed to minimize the thereby added quantities of salts to be decomposed. It had been found that the introduction of raw water via the electrode chambers did not obviate the electrolyzing of its minerals.

One expedient practiced has been to employ for rinsing in each electrode chamber, water obtained partly or wholly from the corresponding middle compartment where it has been partly purified. Another device has been to wash the electrode compartments of the last cells of the series with purified water subtracted from the final output of the processing.

Operations such as the foregoing, while effecting substantial economic improvement over rinsing the electrode chambers with raw water, do not relieve the electric input of the task of decomposing under identical conditions as large a proportion of the salts contained in the washwater diversion as in the main flow that becomes the final purified product. Nor does such procedure reduce the quantity of rinse water to a low proportion of the useful production, such as is economically necessary in large-scale working and where the water requires considerable pumping before treatment. Usually, the quantity of rinse water has been of the same order of magnitude as that of the purified output.

My invention has among its objects such separation of the management of the wash water as to make the overall process workable with any improved form of multi-compartment cells ordinarily employed in the art.

Another object is to effect separate repurification and continuous cyclic reuse of nearly the whole of the rinse water, through an economical method of individual and joint treatment of the cathodic and anodic liquids.

An additional object is, through this repurification, to reduce the overflows from the anodic and cathodic chambers to respective and independent rates such as will maintain the concentrations in these chambers at optimum balances of electric conductivity as against diffusive recombination and diaphragm corrosion. A related object is thereby to circulate the rinse waters at relatively low rates requiring correspondingly small work of repurification.

A further object is to remove chlorine and other relatively fugitive solutes from the anodic liquid without the employment therefor of any energy except that required for other purposes in the operation.

Still another object is to effect a most advantageous combination of the economic merits peculiar to electrolytic purification, with those inherent in the final removal of decomposition products by heating operations; whereby the generally more expensive energy of electricity may be employed for the primary function of decomposing the salts originally in the product water only; and wherein relatively small quantities per hour, of electrode liquids maintained at considerable concentrations of their solutes, need be heated for the separation of the water therefrom before its return to the cells.

With these and other objects such as will appear, the nature of my invention is as set forth in the following specification based upon a typical example, whereto its scope is not closely limited.

In my new process preferably the raw liquid is continuously fed into the middle compartment of the first cell and the purified product discharged from that of the last in a series; while a small flow of liquid is withdrawn, preferably continuously, from each of the electrode chambers, deprived of practically all of its solutes by thermal treatment, and returned as nearly pure water to the flow line of the middle compartments of the series. If the original water be highly impure, it may be advantageous to return all of the thermally purified water to the first cell; but if it is only moderately so it may serve better to distribute the return among several of the cells. In any event, the return is made preferably to chambers other than the electrode compartments, in order to avoid dilution of the anodic and cathodic liquids.

If the thermally purified liquid is restored to the flow line of the product water in one of the last cells of the series, the operation may be so adjusted that a given quantity of electrode water passes through the thermal cycle only once and becomes added to output of the electrolytic purification. It will be understood that the anodic liquid of all the cells is pooled before the thermal purification rather than treated as flows individual to the cells, and that this applies also to the cathodic liquid.

The thermal treatment of the cathodic liquid herein comprises boiling off the major part of its water from its residue of basic (and sometimes ferruginous) hydrates and undecomposed minerals, condensing the water and returning it to the electrolytic purifier. The amount of water thus cyclically distilled need be only slightly more than that which carry away, at the highest concentrations compatible with the proper performance of the electrolytic treatment, the quantity of hydrates formed at the cathodes. It is a minor fraction of the output of electrically purified water, dependent upon the initial and final mineralization of the latter. The hydrates are ordinarily those of sodium, calcium and magnesium, the first by far predominant.

The thermal treatment of the anodic liquid herein comprises expelling most of the chlorine, carbon dioxide and volatile acidic solutes, by heating the charged liquid sufficiently therefor but with little or no boiling of the water, and returning the unloaded water to the electrolytic purifier. As in the case of the basic liquid, the amount of water cyclically thus heated need only be a small fraction of the useful output, i. e. a withdrawal sufficient to carry away the chlorine and similar solutes at the highest permissible concentration of the anodic bath.

While either of these treatments of the electrode liquids may be conducted without the other, or both without any thermal cooperation between the two, the preferred embodiment of my invention comprises the utilization of the heat of vaporization surrendered in the condensing of the cathode-liquid distillate, for treating the anodic liquid with the object aforesaid, through the medium of a suitable condenser. It also comprises exploitation of the reduction of pressure that may be effected in both the boiling and the condensing operations, by sealing the auxiliary thermal system from the atmosphere. In consequence, while the required total heat of the vapor of the cathodic water is little altered the temperature thereof may be much reduced, and in the condenser the extraction of chlorine and other gases from the anodic water greatly facilitated by the partial evacuation. To exploit this operation most conveniently by avoidance of vacuum pumping of the gases, it is preferable to employ herein a condenser of the ejector type.

The pumping of the anodic liquid as cooling water through the condenser is partly incidental to its circulation from and back to the electrolytic cell. If necessary or desirable under some conditions, the cooling capacity of the circulated anodic water may be increased by auxiliary cooling thereof, as by heat exchange with the output water from the electrolytic treatment, through the walls of a tubular apparatus. Thereby the electrolytic system may be protected from excessive warming. Naturally this feature of the operation may be varied as between summer and winter.

The thermal treatments of the electrode liquids each yield waste products that in some cases are worth recovering. The alkaline residue from the boiling of the cathodic liquid can be purified and dried by separate treatment when this is justified by its original composition and the price-level of the product. Likewise, the anodic chlorine can be recovered and either sold if sufficiently pure or locally employed for sterilizing other water or sewage. Or the chlorine may be bubbled into a suitable bath of the alkaline product, for the formation of chlorides and hypochlorites to be used in sanitation.

Aside from these possible sanitary uses of byproducts, it is to be noted that within the electrolytic-thermal cycle itself, the cathodic and anodic treatments are completely bactericidal through distillation and chlorination. As in the prior art, the water subjected to the electrolytic treatment may thereby have any colloidal content reduced, as well as its mineral salts.

It is obvious that upon its disclosure this invention can be understood by those skilled in the art, and that apparatus suitable therefor can be readily designed. Therefore I define its essence as the useful new combination of physicochemical operations above set forth, differing from the prior art as delimited in the following claims.

I claim:

1. In the electrolytic purification of water the improvement which comprises withdrawing portions of the solutions formed in the cathodic and anodic zones, subjecting the withdrawn liquids to thermal treatments that separate the water and the solutes, and returning to the electrolytic system the water recovered from the thermal treatments.

2. In the operation according to claim 1, the thermal treatment of the cathodic liquid which comprises boiling off the water from its solutes, condensing the vapor from the boiling, and returning the condensate to the electrolytic system.

3. In the operation according to claim 1, the thermal treatment of the anodic liquid which comprises heating the liquid sufficiently to expel most of its gaseous solutes, and returning the gas-freed water to the electrolytic system.

4. In the operation according to claim 1, the joint thermal treatment of both electrode liquids which comprises boiling the cathodic liquid, bringing the vapor therefrom into heat-exchanging relation with the anodic liquid, heating and gas-freeing the anodic liquid thereby, and returning to the electrolytic system the water purified by the joint treatment.

5. In the operation according to claim 1, the joint thermal treatment of both electrode liquids in a system sealed from and working below atmospheric pressure, which comprises boiling the cathodic liquid in one portion of said system, conducting its vapor to a condenser in another portion, conducting also the anodic liquid into the condenser and removing its dissolved gases therefrom, and returning the jointly distilled and gas-freed water to the electrolytic system.

6. In the operation according to claim 1, the recovery of a chemical byproduct which comprises bringing chlorine-bearing gases expelled from the anodic liquid into contact with a solution of the basic residues from the cathodic liquid, with resultant formation of chlorides and hypochlorites.

GEORGE T. SOUTHGATE.